US012608324B2

(12) United States Patent
Nanjappa et al.

(10) Patent No.: US 12,608,324 B2
(45) Date of Patent: Apr. 21, 2026

(54) MANAGING A CONFIGURATION OF A DOCKING STATION AND COMPUTING PERIPHERALS

(71) Applicant: Dell Products L.P., Round Rock, TX (US)

(72) Inventors: Jyothi Bandakka Nanjappa, Bangalore (IN); Srinivasa Ragavan Rajagopalan, Bangalore (IN); Gokul Thiruchengode Vajravel, Bangalore (IN); Ankit Kumar, Jharkhand (IN); Ramanaa Hv, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 21 days.

(21) Appl. No.: 18/658,047

(22) Filed: May 8, 2024

(65) Prior Publication Data

US 2025/0348439 A1     Nov. 13, 2025

(51) Int. Cl.
*G06F 13/10*          (2006.01)
(52) U.S. Cl.
CPC .......... *G06F 13/10* (2013.01); *G06F 2213/40* (2013.01)
(58) Field of Classification Search
CPC ............................ G06F 1/3209; G06F 11/2289
See application file for complete search history.

(56) References Cited

U.S. PATENT DOCUMENTS

| | | | | |
|---|---|---|---|---|
| 9,672,184 B1 * | 6/2017 | Jain | ..................... | G06F 11/2289 |
| 11,757,712 B1 * | 9/2023 | Thanabalan | ............ | H04L 41/12 |
| | | | | 709/222 |
| 2009/0033287 A1 * | 2/2009 | Nikazm | ................. | G06F 1/263 |
| | | | | 320/137 |

(Continued)

OTHER PUBLICATIONS

Dell Ultrasharp 40 Curved WUHD Monitor—U4021QW (https://www.dell.com/en-us/shop/dell-ultrasharp-40-curved-wuhd-monitor-u4021qw/apd/210-becu/monitors-monitor-accessories, viewed on Aug. 9, 2024); 7 pages.

(Continued)

*Primary Examiner* — Getente A Yimer
(74) *Attorney, Agent, or Firm* — McDermott Will & Schulte LLP

(57)          ABSTRACT

Managing a configuration of a docking station and computing peripherals, including performing, at a first time, a calibration and configuration of a configuration management model, including identifying contextual data associated with the docking station and the computing peripherals; training, based on the contextual data, the configuration management model, including generating a configuration policy including configuration rules, the configuration rules for performing computer-implemented actions to automatically configure the docking station and the computing peripherals; performing, at a second time, a steady-state management of the docking station and the computing peripherals, including monitoring the contextual data of the docking station and the computing peripherals; and accessing the configuration management model including the configuration policy, iden- (Continued)

tifying the configuration rules based on the monitored contextual data, applying the configuration rules to perform the computer-implemented actions to configure the docking station and the computing peripherals.

18 Claims, 4 Drawing Sheets

(56)                    References Cited

U.S. PATENT DOCUMENTS

| | | | |
|---|---|---|---|
| 2020/0218324 A1* | 7/2020 | Decamp | G06F 1/3209 |
| 2022/0221449 A1* | 7/2022 | Joern | G01N 33/543 |
| 2024/0385971 A1* | 11/2024 | Dunn | G06F 13/10 |

OTHER PUBLICATIONS

Dell 27 Monitor—E2723HN (https://www.dell.com/en-us/shop/dell-27-monitor-e2723hn/apd/210-bcwv/monitors-monitor-accessories#techspecs_section, viewed on Aug. 9, 2024); 6 pages.

* cited by examiner

_400_

_402_

Identify
Contextual Data

_404_

Provide
Contextual Data

_406_

Train
Configuration
Management
Model

_408_

Monitor
Contextual Data

_410_

Access
Configuration
Management
Model

_412_

Identify
Configuration
Rules

_414_

Provide
Configuration
Rules

_416_

Apply
Configuration
Rules

MANAGING A CONFIGURATION OF A DOCKING STATION AND COMPUTING PERIPHERALS

BACKGROUND

Field of the Disclosure

The disclosure relates generally to managing a configuration of a docking station and computing peripherals.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A docking station is a peripheral device that allows a laptop or portable computer to connect to various external peripherals and accessories. It serves as a central hub, providing additional ports and functionality beyond what the laptop itself offers. Docking stations are commonly used in office environments, where users can quickly connect their laptops to a larger monitor, keyboard, mouse, and other devices. Docking stations typically include a variety of ports, such as USB, HDMI, DisplayPort, Ethernet, audio jacks, and power connectors. These ports allow users to connect external monitors, printers, external hard drives, and other peripherals without the hassle of plugging and unplugging individual cables each time.

SUMMARY

Innovative aspects of the subject matter described in this specification may be embodied in a method of managing a configuration of a docking station and computing peripherals, including performing, at a first time, a calibration and configuration of a configuration management model, including: identifying, by a docking station, contextual data associated with the docking station and the computing peripherals coupled to the docking station; providing, by the docking station and to an external computing device in communication with the docking station, the contextual data; training, by the external computing device and based on the contextual data, the configuration management model, including generating a configuration policy including configuration rules, the configuration rules for performing computer-implemented actions to automatically configure the docking station and the computing peripherals; performing, at a second time, a steady-state management of the docking station and the computing peripherals, including: monitoring, by the docking station, the contextual data of the docking station and the computing peripherals; and providing, by the docking station and to the external computing device, the contextual data; in response to receiving the contextual data, i) accessing, by the external computing device, the configuration management model including the configuration policy, ii) identifying, by the external computing device, one or more of the configuration rules based on the monitored contextual data, iii) providing, by the external computing device and to the docking station, the one or more configuration rules, and iv) applying, by the docking station, the one or more configuration rules to perform one or more of the computer-implemented actions to configure the docking station and the computing peripherals.

Other embodiments of these aspects include corresponding systems, apparatus, and computer programs, configured to perform the actions of the methods, encoded on computer storage devices.

These and other embodiments may each optionally include one or more of the following features. For instance, the contextual data includes: calendaring information associated with the information handling system, identifying information associated with the computing peripherals, a quantity of computing peripherals coupled to the docking station, a power state of the computing peripherals coupled to the docking station, an user authentication of a user of the information handling system, and a geo-location of the docking station and the computing peripherals. The contextual data includes historical usage of the computing peripherals. The contextual data includes an initial time of use of the docking station, and the computing peripherals. Identifying, by the docking station, capabilities associated with each of the computing peripherals, wherein the configuration rules are identified based on the monitored contextual data and the capabilities associated with each of the computing peripherals. The computer-implemented actions include automatically establishing connections between the computing peripherals and the docking station without user interaction. The computer-implemented actions include automatically initializing the computing peripherals and the docking station without user interaction. The computer-implemented actions include automatically providing power to the computing peripherals through the docking station without user interaction.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
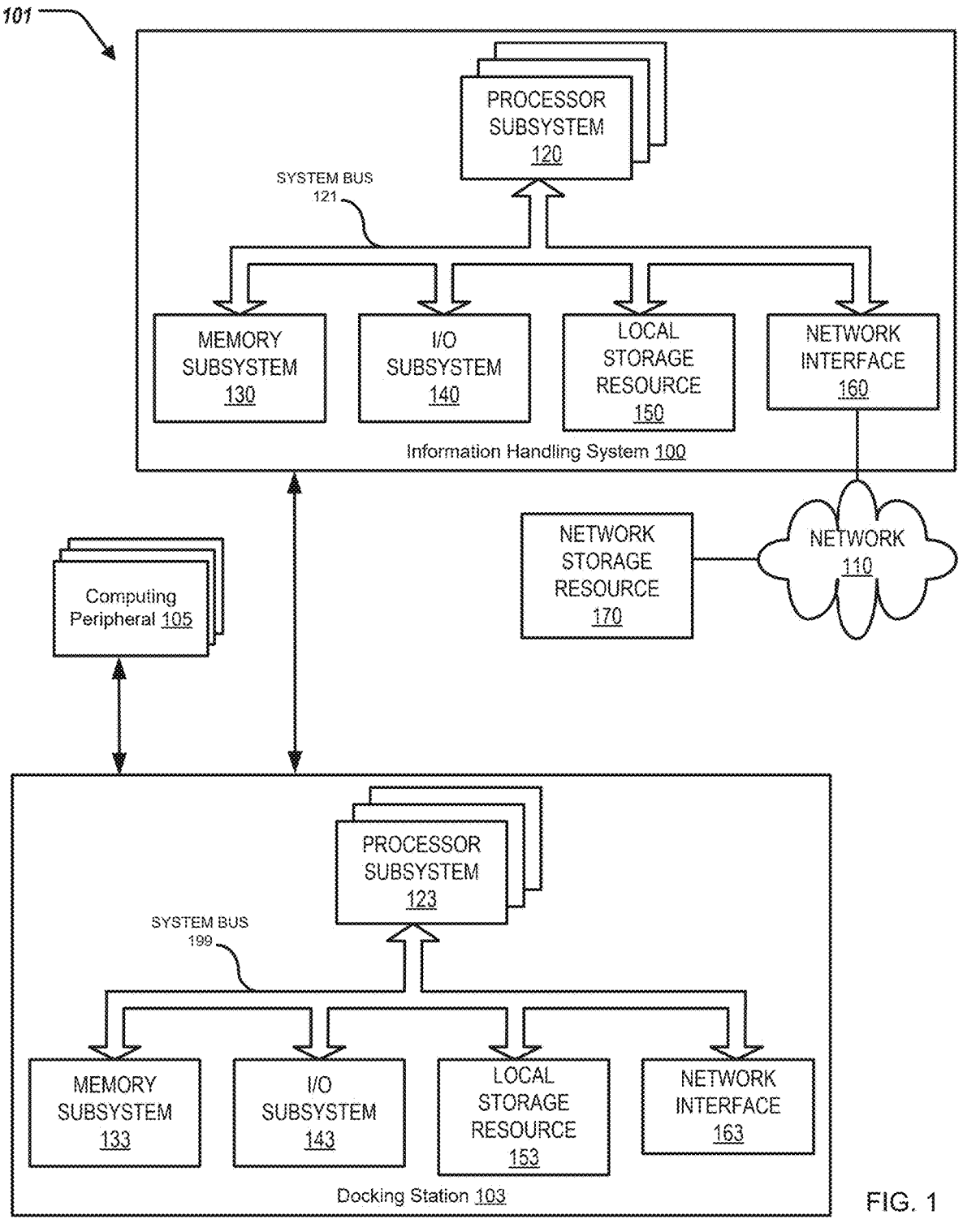
FIG. 1 is a block diagram of selected elements of an embodiment of a computing environment.

This disclosure discusses methods and systems for managing a configuration of a docking station and computing peripherals. In short, the docking station can facilitate context-aware and user-centric experiences. For example, the docking station and the computing peripherals can be configured based on context for immediate productivity.

Specifically, this disclosure discusses a system and a method for managing a configuration of a docking station and computing peripherals, including performing, at a first time, a calibration and configuration of a configuration management model, including: identifying, by a docking station, contextual data associated with the docking station and the computing peripherals coupled to the docking station; providing, by the docking station and to an external computing device in communication with the docking station, the contextual data; training, by the external computing device and based on the contextual data, the configuration management model, including generating a configuration policy including configuration rules, the configuration rules for performing computer-implemented actions to automatically configure the docking station and the computing peripherals; performing, at a second time, a steady-state management of the docking station and the computing peripherals, including: monitoring, by the docking station, the contextual data of the docking station and the computing peripherals; and providing, by the docking station and to the external computing device, the contextual data; in response to receiving the contextual data, i) accessing, by the external computing device, the configuration management model including the configuration policy, ii) identifying, by the external computing device, one or more of the configuration rules based on the monitored contextual data, iii) providing, by the external computing device and to the docking station, the one or more configuration rules, and iv) applying, by the docking station, the one or more configuration rules to perform one or more of the computer-implemented actions to configure the docking station and the computing peripherals.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of a computing environment 101 including an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The environment 101 can further include a docking station 103 (or a "smart" docking station). The docking station 103 can be coupled to the information handling system 101—that is, the information handling system 101 can be physically coupled to the docking station 103 as well as communicatively coupled to the docking station 103. One or more peripherals 105 can be coupled (physically and communicatively) to the docking station 103. In short, the docking station 103 facilitates connection between the information handling system 101 and the peripherals 105 acting as a central hub to stream connectively and productivity of the information handling system 101. The peripherals 105 can include external displays, keyboards, mice, wired Ethernet, backup hard drives, printers, and the like.

The docking station 103 can include a processor subsystem 123, a memory subsystem 133, an I/O subsystem 143, a local storage resource 153, a network interface 163, and a system bus 199. The processor subsystem 123, the memory subsystem 133, the I/O subsystem 143, the local storage resource 153, the network interface 163, and the system bus 199 can be similar to (similar functionality) the processor subsystem 120, the memory subsystem 130, the I/O subsystem 140, the local storage resource 150, the network interface 160, and the system bus 121 of the information handling system 100.

Figure 2:
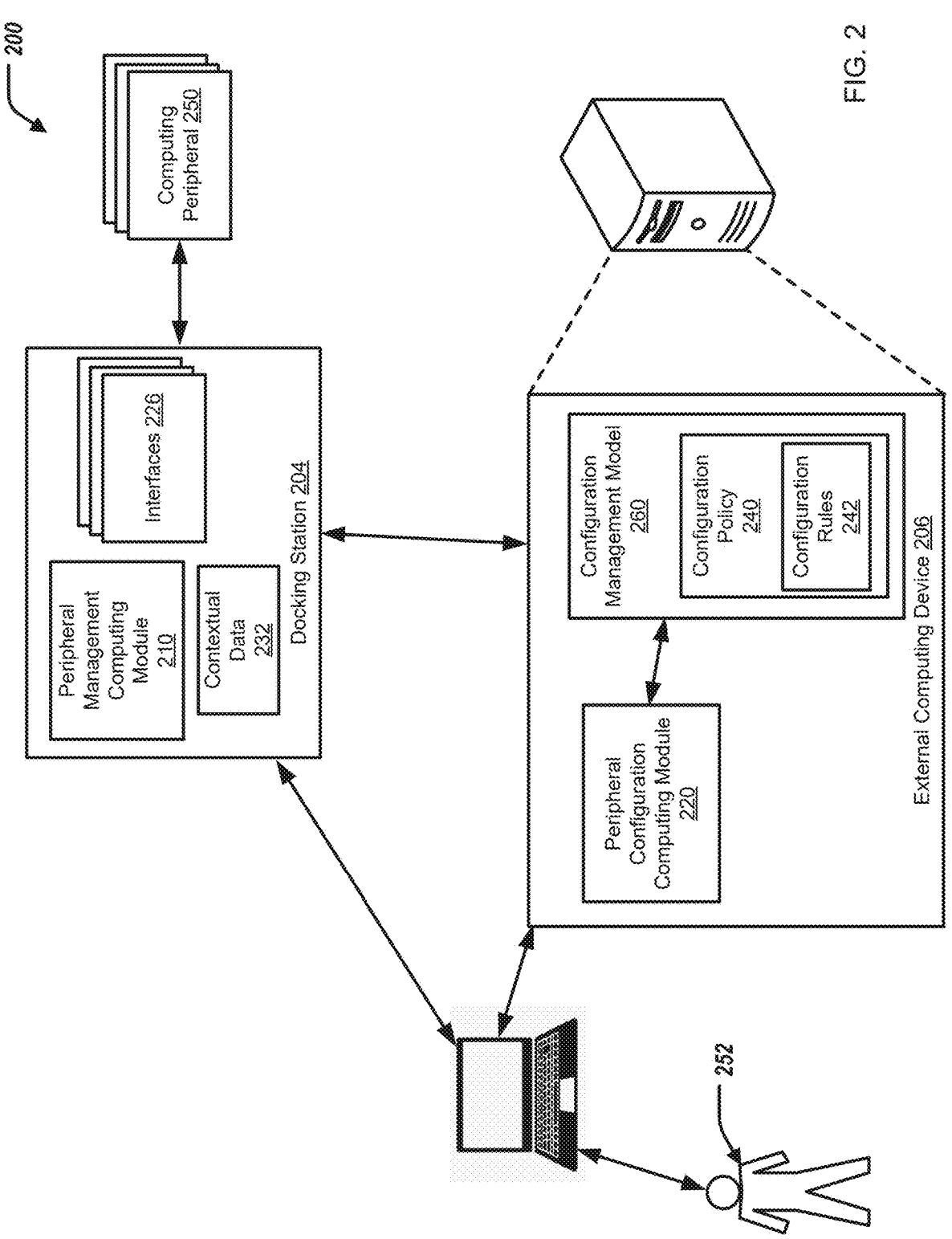
FIG. 2 illustrates a block diagram of a computing environment for managing a configuration of a docking station and computing peripherals.

Turning to FIG. 2, FIG. 2 illustrates an environment 200 including an information handling system 202, a docking station 204, and an external computing device 206. In some examples, the information handling system 202 is similar to, or includes, the information handling system 100 of FIG. 1.

The docking station 204 can include a peripheral management computing module 210. The docking station 204 can further include interfaces (or ports) 226. In some examples, the docking station 204 is similar to, or includes, the docking station 103 of FIG. 1.

The external computing device 206 can include a peripheral configuration computing module 220. The external computing device 206 can be a cloud-based computing device (or cloud-based server). The external computing device 206 can include one or more computing devices/computing servers.

The information handling system 202 can be in communication with the docking station 204. That is, the information handling system 202 can be physically and communicably coupled with the docking station 204. In some examples, the information handling system 202 is in communication with the docking station 204 over a stateless out-of-band (OOB) channel. The information handling system 202 can further be in communication with the external computing device 206, e.g., over a network (the Internet).

The docking station 204 can be in communication with the information handling system 202. That is, the docking station 204 can be physically and communicably coupled with the information handling system 202. The docking station 204 can further be in communication with the external computing device 206, e.g., over a network (the Internet).

The external computing device 206 can be in communication with the information handling system 202 and the docking station 204, e.g., over a network (the Internet).

One or more computing peripherals 250 (or peripheral devices 250, or devices 250) can be coupled to the docking station 204. The computing peripherals 250 can be coupled to the docking station 204 through the interfaces 226. The computing peripherals 250 can be similar to, or include, the computing peripherals 105 of FIG. 1. For example, the computing peripherals 250 can include a monitor, a storage device, a mouse, a keyboard, a printer, external camera, or a webcam.

In short, the docking station 204 can facilitate context-aware and user-centric experiences. For example, the docking station 204 and the computing peripherals 250 can be configured based on context for immediate productivity.

Figure 3:
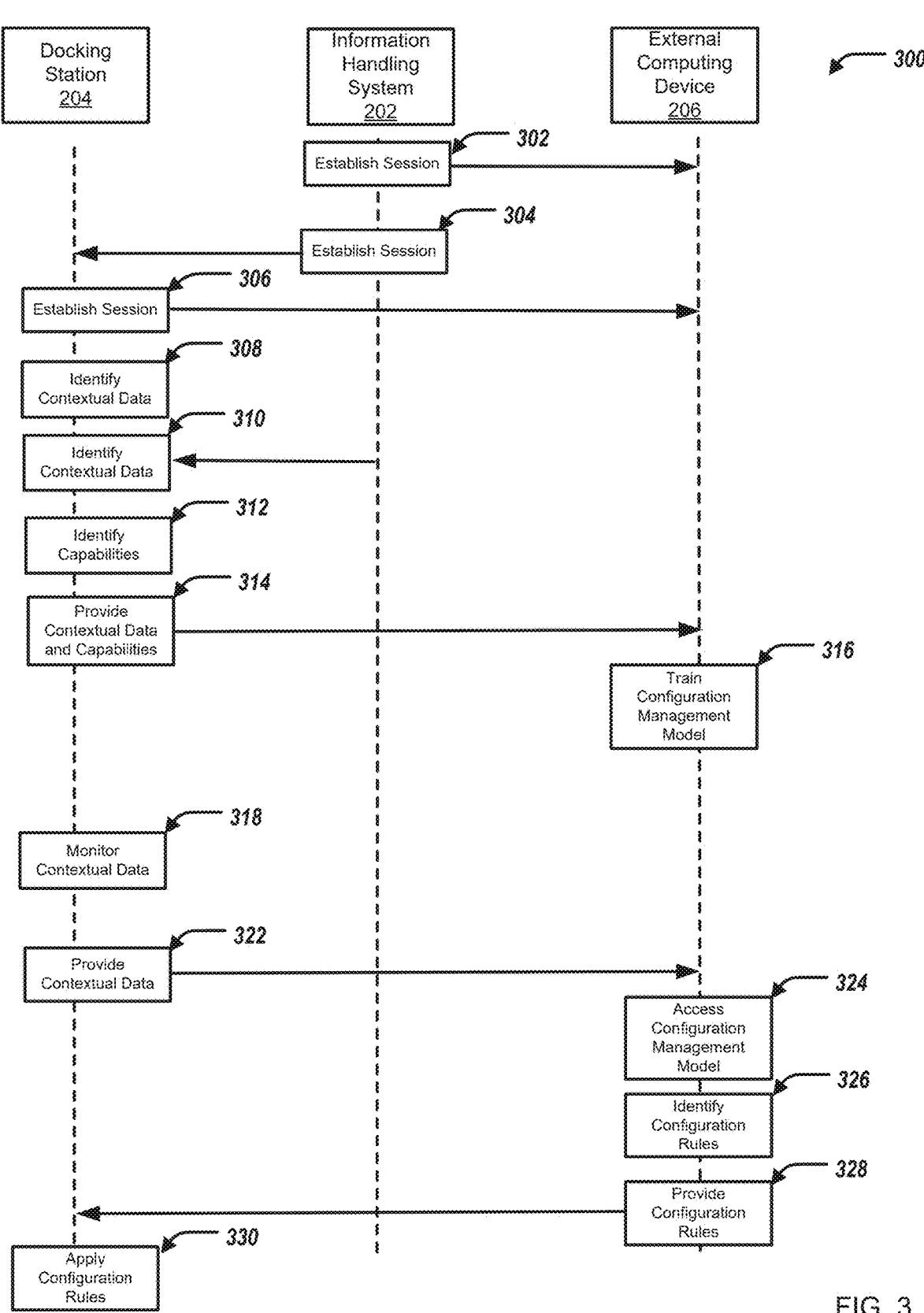
FIG. 3 illustrates a swim-lane diagram for managing a configuration of a docking station and computing peripherals.

FIG. 3 illustrates a swim-lane diagram of a method 300 for managing a configuration of a docking station and computing peripherals. The method 300 may be performed by the information handling system 100, the docking station 103, the information handling system 202, the docking station 204, and/or the external computing device 206, and with reference to FIGS. 1-2. It is noted that certain operations described in method 300 may be optional or may be rearranged in different embodiments.

The information handling system 202 establishes a connection (communication connection) with the external computing device 206, at 302.

The information handling system 202 establishes a connection (communication connection) with the docking station 204, at 304. In other words, a coupling (physical and communication) is established between the information handling system 202 and the docking station 204.

The docking station 204 establishes a connection with the external computing device 206, at 306. For example, the docking station 204 established the connection with the external computing device 206 over the Internet. In some examples, when the docking station 204 establishes the connection with the external computing device 206, the docking station 204 provides data to the external computing device 206 indicating the interfaces 226 and the computing peripherals 250 are coupled to the interfaces 226. That is, data indicating which interfaces 226 are being used and by what type of computing peripheral 250 is connected/coupled to the interfaces 226 that are being used.

To that end, at a first time, the peripheral configuration computing module 220 can perform a calibration and configuration of a configuration management model 260. Specifically, performing the calibration and the configuration of configuration management model 260 can include identifying contextual data. The docking station 204 can identify contextual data 232 associated with the docking station 204 and the computing peripherals 250 coupled to the docking station 204, at 308. Specifically, the peripheral management computing module 210 identifies contextual data 232 associated with the docking station 204 and the computing peripherals 250 coupled to the docking station 204.

In some examples, the contextual data 232 associated with the docking station 204 can include identifying information associated with the computing peripherals 250. For example, the identifying information associated with the computing peripherals 250 can include a type of the computing peripherals 250 coupled to the docking station 204—monitor, keyboard, mouse, etc. The identifying information of the computing peripherals 250 can further include make and model information of the computing peripheral 250.

In some examples, the contextual data 232 associated with the docking station 204 can include a quantity of computing peripherals coupled to the docking station 204. For example, the docking station 204 can include four interfaces 226, with only three of the interfaces 226 being coupled to respective computing peripherals 250.

In some examples, the contextual data 232 associated with the docking station 204 can include a geo-location of the docking station 204 and the computing peripherals 250. The geo-location data of the docking station 204 and the computing peripherals 250 can include city-based geo-location data or an area within the city. The geo-location data of the docking station 204 and the computing peripherals 250 can include more granularity, such as an office building of the docking station 204 and the computing peripherals 250, and/or a specific room/floor of the office building of the docking station 204 and the computing peripherals 250.

In some examples, the contextual data 232 associated with the docking station 204 can include historical usage of the computing peripherals 250. For example, the historical usage of the computing peripherals 250 can include i) how long each computing peripheral 250 was utilized, ii) a time frame of when each computing peripheral 250 was used, iii) how often each computing peripheral 250 was used, and the like.

In some examples, the contextual data 232 associated with the docking station 204 can include an initial time of use of the docking station 204 and the computing peripherals 250. For example, the initial time of use of the docking station 204 and the computing peripherals 250 can include a time when the docking station 204 and the computing peripherals 250 are initially powered on for a day. For example, the docking station 204 and the computing peripherals 250 can be "turned on"—changed to an on-power state and initialized for use—at 8 am Monday-Friday.

In some examples, the contextual data 232 associated with the docking station 204 can include a power state of the computing peripherals 250 coupled to the docking station 204. That is, the docking station 204 can be coupled to multiple computing peripherals 250, with only a subset of the computing peripherals 250 in an on-power state. That is, a subset of the computing peripherals 250 can be in an on-power state and a subset of the computer peripherals 250 can be in an off-power state. Further, each computing peripheral 250 coupled to the docking station 204 can consume a varying amount of power—e.g., from zero Watts (when a computing peripheral 250 is in an off-power state) to forty Watts (when a computing peripheral 250 such as a display is powered on and being utilized). Further, the contextual data 232 can include the power state of the computing peripherals 250 and also an amount of power consumed by the computing peripherals 250. The contextual data 232 can include changes or variations of the amount of power consumed by the computing peripherals 250 during usage—e.g., an initial burst of power consumed by the computing peripheral 250 followed by a lower sustained power consumption of the computing peripheral 250 over time.

The docking station 204 can identify contextual data 232 associated with the information handling system 202, at 310. That is, the peripheral management computing module 210 identifies contextual data 232 associated with the docking station 204 and the computing peripherals 250 coupled to the docking station 204.

In some examples, the contextual data 232 associated with the information handling system 202 can include calendaring information associated with the information handling system 202. The contextual data 232 can include calendaring information associated with the user 252 of the information handling system 202 and/or associated with the information handling system 202. That is, the user 252 can have appointments/meetings associated with specific dates and times that serve as the contextual data 212. The calendaring information can indicate whether the event is a video teleconference, teleconference, in-person meeting, or personal appointment.

In some examples, the contextual data 232 associated with the information handling system 202 can include an user authentication of the user 252 of the information handling system 202. For example, the user 252 can provide login credentials to the information handling system 202 (such as username, password, and/or biometric credentials) to identify the user 252.

The docking station 204 can identify capabilities associated with each of the computing peripherals 250, at 312. The capabilities of the computing peripherals 250 can be specific to each computing peripheral 250 and based on the make and model of the computing peripheral 250. For example, when the computing peripheral 250 includes a display, the capabilities of the display can include a refresh rate, a pixel density, and the like. For example, when the computing peripheral 250 includes a storage device, the capabilities of the storage device can include a storage size, an access speed, and the like. The capabilities of each of the computing peripherals 250 are based on the computing peripherals 250 and specific to the computing peripherals 250.

The docking station 204 can provide, to the external computing device 206, the contextual data 232. For example, the docking station 204 can provide the contextual data 232 to the external computing device 206 over the Internet. In some examples, the docking station 204 can provide the contextual data 232 periodically—e.g., every 1 second, 1 minute, 1 hour, 1 day. In some examples, the docking station 204 can provide the contextual data 232 in response to a request from the external computing device 206. The external computing device 206 can receive the contextual data 232.

The external computing device 206 can train the configuration management model 260, at 316. Specifically, the peripheral configuration computing module 220 of the external computing device 206 can train the configuration management model 260. The peripheral configuration computing module 220 can train the configuration management model 260 based on the contextual data 232. Specifically, the peripheral configuration computing module 220 can generate, based on the contextual data 232, a configuration policy 240 that includes configuration rules 242. In some examples, the configuration rules 242 are rules for performing computer-implemented actions for automatically configuring the docking station 204 and the computing peripherals 250.

To that end, the peripheral configuration computing module 220 can train the configuration management model 260 to establish connections between the contextual data 232 and the configuration rules 242. Specifically, the configuration management model 260 can identify one or more configurations rules 242 to be applied based on the contextual data 232, and in particular, one or more combinations of the contextual data 232. That is, two or more datum from the contextual data 232 can be associated with a configuration rule 242; and/or one datum of the contextual data 232 can be associated with two or more configuration rules 242. In some examples, the peripheral configuration computing module 220 can train the configuration management model 260 using a machine learning process, and/or a neural network (e.g., a convolution neural network).

In other words, the peripheral configuration computing module 220 can train the configuration management model 260 to establish connections between the contextual data 232 and the configuration rules 242 by identifying trends and triggers associated with the contextual data 232 and generating the configuration rules 242 based on such trends and triggers.

In some examples, the configuration management model 260 is specific for the user 252. In some examples, the configuration management model 260 can be associated with multiple users, with the configuration management model 260 including multiple configuration policies for each user.

In some examples, the configuration rules 242 for performing computer-implemented actions for automatically configuring the docking station 204 and the computing peripherals 250 can include automatically establishing connections between the computing peripherals 250 and the docking station 204 without user interaction. For example, the contextual data 252 can indicate that the initial time of use of the docking station 204 and the computing peripherals 250 is 8 am; and a historical usage at 8 am indicates only a display device is coupled to the docking station 204. The peripheral configuration computing module 220 can train the configuration management model 260 to establish connections between this particular contextual data 252 and the configuration rules 242. Specifically, the peripheral configuration computing module 220 can establish a particular configuration rule 242 associating the contextual data 252 of an initial time of use of 8 am and a connected display device to the docking station 204 with a configuration rule 242 for automatically establishing a connection between the display device and the docking station 204 without user interaction.

In some examples, the configuration rules 242 for performing computer-implemented actions for automatically configuring the docking station 204 and the computing peripherals 250 can include automatically initializing the computing peripherals 250 and the docking station 204 without user interaction. For example, the contextual data 252 can indicate i) a geo-location of the docking station 204 and the computing peripherals 250 as a conference room associated with the user 252 and ii) historical usage of a projector and a microphone as computing peripherals connected to the docking station 204. The peripheral configuration computing module 220 can train the configuration management model 260 to establish connections between this particular contextual data 252 and the configuration rules 242. Specifically, the peripheral configuration computing module 220 can establish a particular configuration rule 242 associating the contextual data 232 of the conference room geo-location data and the historical usage of the projector and microphone with a configuration rule 242 for automatically initializing the projector and the microphone and the docking station 204 without user interaction.

In some examples, the configuration rules 242 for performing computer-implemented actions for automatically configuring the docking station 204 and the computing peripherals 250 can include automatically providing power to the computing peripherals 250 though the docking station 204 without user interaction. For example, the contextual data 252 can indicate a calendaring event of a video teleconference at 11 am. The peripheral configuration computing module 220 can train the configuration management model 260 to establish connections between this particular contextual data 252 and the configuration rules 242. Specifically, the peripheral configuration computing module 220 can establish a particular configuration rule 242 associating the contextual data 232 of the calendaring event of the video teleconference at 11 am with a configuration rule 242 for automatically providing power to a connected webcam and microphone without user interaction.

In some examples, the configuration rules 242 for performing computer-implemented actions for automatically configuring the docking station 204 and the computing peripherals 250 can include selectively providing power to connected computing peripherals 250. For example, the contextual data 232 can indicate that a peripheral device 250 is powered off. The peripheral configuration computing module 220 can train the configuration management model 260 to establish connections between this particular contextual data 232 and the configuration rules 242. Specifically, the peripheral configuration computing module 220 can establish a particular configuration rule 242 associating the contextual data 232 of the peripheral device 250 being connected to the docking station 204 but powered down (off-power state) with a configuration rule 242 for automatically deactivating the interface 226 that the peripheral device 250 is connected to.

For example, the contextual data 252 can indicate a calendaring event of a video teleconference at 11 am and a geo-location of the docking station 204 and the computing peripherals 250 as a conference room associated with the user 252. The peripheral configuration computing module 220 can train the configuration management model 260 to establish connections between this particular contextual data 232 and the configuration rules 242. Specifically, the peripheral configuration computing module 220 can establish a particular configuration rule 242 associating the contextual data 232 of the calendaring event of the video teleconference at 11 am and the geo-location of the conference room with a configuration rule 242 to prioritize providing power to the interface 226 that the webcam and microphone are connected to over other interfaces 226 that are connected to other peripheral devices 250.

In some examples, the peripheral configuration computing module 220 can generate the configuration policy 240 that includes the configuration rules 242 based on the contextual data 232 and the capabilities associated with each of the computing peripherals 250. That is, the configuration rules 242 can be modified based on the capabilities of the computing peripherals 250.

For example, the contextual data 252 can indicate i) a geo-location of the docking station 204 and the computing peripherals 250 as a conference room associated with the user 252 and ii) historical usage of a projector and microphone as computing peripherals 250 connected to the docking station 204. Furthermore, the projector can be associated with a pixel density. The peripheral configuration computing module 220 can train the configuration management model 260 to establish connections between this particular contextual data 232, the capabilities of the computing peripherals 250, and the configuration rules 242. Specifically, the peripheral configuration computing module 220 can establish a particular configuration rule 242 associating the contextual data 232 of the conference room geo-location data, the historical usage of the projector and microphone, and the pixel density parameter of the projector with a configuration rule 242 for automatically initializing the projector and the microphone and the docking station 204 without user interaction, including maximizing the pixel density of the projector.

For example, the contextual data 252 can indicate a calendaring event of a video teleconference at 11 am. The peripheral configuration computing module 220 can train the configuration management model 260 to establish connections between this particular contextual data 232 and the configuration rules 242. Furthermore, a webcam used for the video teleconference can be associated with a resolution. Specifically, the peripheral configuration computing module 220 can establish a particular configuration rule 242 associating the contextual data 232 of the calendaring event of the video teleconference at 11 am, and the resolution of the webcam with a configuration rule 242 for automatically providing power to the connected webcam and microphone without user interaction, including maximizing the resolution of the webcam.

In some implementations, at a second time after the first time, a steady-state management of the docking station 204 and the computing peripherals 250 is performed. In other words, the peripheral management computing module 210 can monitor the docking station 204 and the computing peripherals 250 for contextual data 232 that the peripheral configuration computing module 220 determines could trigger activation of the configuration rules 242.

Specifically, the peripheral management computing module 210 can monitor the contextual data 232 of the docking station 204 and the computing peripherals 250, at 318. For example, the peripheral management computing module 210 can detect coupling of a computing peripheral 250 to the docking station 204; detect a type of computing peripheral 250 coupled to the docking station 204; a geo-location of the docking station 204 and the computing peripherals 250; a current time; and/or calendaring information associated with the information handling system 202, and the like. In some examples, the peripheral management computing module 210 identifies contextual data 232 from the docking station 204, the computing peripherals 250, and/or the information handling system 202.

The docking station 204 can provide the contextual data 232 to the external computing device 206, at 322. In response to the monitored contextual data 232, the peripheral configuration computing module 220 of the external computing device 206 accesses the configuration management model 260 including the configuration policy 240, at 324. The peripheral configuration computing module 220 can further identify one or more of the configuration rules 242 based on the monitored contextual data 232, at 326.

The external computing device 206 can provide the identified configuration rules 242 to the docking station 204, at 328. Specifically, the peripheral configuration computing module 220 provides the identified configuration rules 242 to the docking station 204. The docking station 204 applies the configuration rules 242, at 330. Specifically, the peripheral management computing module 210 of the docking station 210 applies the configuration rules 242 to perform one or more computer-implemented actions to configure the docking station 204 and/or the computing peripherals 250. In other words, the peripheral management computing module 210 can apply appropriate configuration rules 242 based on the monitored contextual data 232 as provided by the configuration management model 260.

For example, the peripheral management computing module 210 monitors the contextual data 232, and provides such to the external computing device 206. The peripheral configuration computing module 220 of the external computing device 206 determines that the monitored contextual data 232 indicates that it is 8 am and the geo-location of the docking station 204 indicates an office associated with the user 252. In response, the peripheral configuration computing module 220 can access the configuration management model 260, identify the configuration rule 242 that is applicable to the time of 8 am and the geo-location of the office, and provide such configuration rule 242 to the docking station 204. The docking station 204 can receive the configuration rule 242, and the peripheral management computing module 210 can apply the configuration rule 242 to automatically establish a connection between a display device and the docking station 204 without user interaction.

For example, the peripheral management computing module 210 monitors the contextual data 232, and provides such to the external computing device 206. The peripheral configuration computing module 220 of the external computing device 206 determines that the monitored contextual data 232 indicates that it 5 minutes to a calendaring event of 11 am of a video teleconference, and the geo-location of the docking station 204 indicates a conference room. In response, the peripheral configuration computing module 220 can access the configuration management model 260, identify the configuration rule 242 that is applicable to the that it is 5 minutes to a calendar event and the geo-location of the conference room, and provide such configuration rule 242 to the docking station 204. The docking station 204 can receive the configuration rule 242, and the peripheral management computing module 210 can apply the configuration rule 242 to automatically provide power through the docking station 204 to a connected projector and microphone without user interaction.

For example, the peripheral management computing module 210 monitors the contextual data 232, and provides such to the external computing device 206. The peripheral configuration computing module 220 of the external computing device 206 determines that the monitored contextual data 232 indicates that a monitor and a projector are coupled to the docking station 204. In response, the peripheral configuration computing module 220 can access the configuration management model 260, identify the configuration rule 242 that is applicable to the historical usage of the monitor and the projector and that the monitor and the projector are both coupled to the docking station 204 concurrently, and provide such configuration rule 242 to the docking station 204. The docking station 204 can receive the configuration rule 242, and the peripheral management computing module 210 can apply the configuration rule 242 to prioritize providing power to the interface 226 that the projector is connected to over the interface 226 that the monitor is coupled to.

For example, the peripheral management computing module 210 monitors the contextual data 232, and provides such to the external computing device 206. The peripheral configuration computing module 220 of the external computing device 206 determines that the monitored contextual data

232 indicates that a new keyboard is coupled with the docking station 204 (e.g., wired or wireless). In response, the peripheral configuration computing module 220 can access the configuration management model 260, identify the configuration rule 242 that is applicable to the detection of a new computing peripheral 250 (initial detection of the computing peripheral 250), and provide such configuration rule 242 to the docking station 204. The docking station 204 can receive the configuration rule 242, and the peripheral management computing module 210 can apply the configuration rule 242 to automatically initialize the keyboard without user interaction.

For example, the peripheral management computing module 210 monitors the contextual data 232, and provides such to the external computing device 206. The peripheral configuration computing module 220 of the external computing device 206 determines that the monitored contextual data 232 indicates the user 252 has provided authentication information such as biometric data (fingerprint) and detects a current time. In response, the peripheral configuration computing module 220 can access the configuration management model 260, identify the configuration rule 242 that is applicable to the authentication information and the current time, and provide such configuration rule 242 to the docking station 204. The docking station 204 can receive the configuration rule 242, and the peripheral management computing module 210 can apply the configuration rule 242 to automatically load personalized configurations of the docking station 204 and the connected computing peripherals 250 (associated with the user 252).

For example, the peripheral management computing module 210 monitors the contextual data 232, and provides such to the external computing device 206. The peripheral configuration computing module 220 of the external computing device 206 determines that the monitored contextual data 232 indicates that a webcam and a storage device are coupled to the docking station 204, and a calendaring event indicates a video teleconference is happening. In response, the peripheral configuration computing module 220 can access the configuration management model 260, identify the configuration rule 242 that is applicable to the webcam and the storage device concurrently coupled to the docking station 204, and an upcoming video teleconference calendaring event, and provide such configuration rule 242 to the docking station 204. The docking station 204 can receive the configuration rule 242, and the peripheral management computing module 210 can apply the configuration rule 242 to prioritize providing power to the interface 226 that the webcam is connected to over the interface 226 that the storage device is connected to (such that the webcam can provide a high resolution image).

For example, the peripheral management computing module 210 monitors the contextual data 232, and provides such to the external computing device 206. The peripheral configuration computing module 220 of the external computing device 206 determines that the monitored contextual data 232 indicates that a headset with a microphone with noise cancellation and a storage device are coupled to the docking station 204, and a calendaring event indicates a video teleconference is happening. In response, the peripheral configuration computing module 220 can access the configuration management model 260, identify the configuration rule 242 that is applicable to the headset and the storage device concurrently coupled to the docking station 204, and an upcoming video teleconference calendaring event, and provide such configuration rule 242 to the docking station 204. The docking station 204 can receive the configuration rule 242, and the peripheral management computing module 210 can apply the configuration rule 242 to prioritize providing power to the interface 226 that the headset is connected to over the interface 226 that the storage device is connected to (such that the headset can provide noise cancellation).

Figure 4:
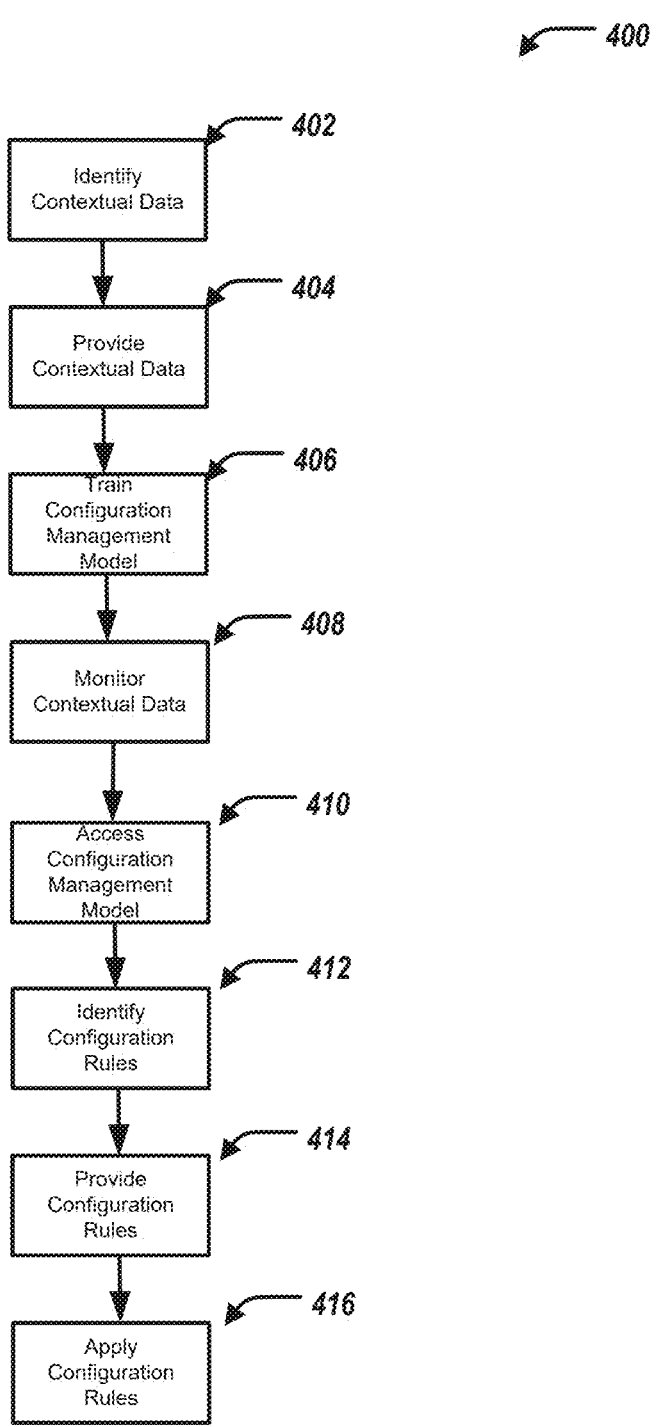
FIG. 4 illustrates a method for managing a configuration of a docking station and computing peripherals.

FIG. 4 illustrates a method 400 for managing a configuration of a docking station and computing peripherals. The method 400 may be performed by the information handling system 100, the docking station 103, the information handling system 202, the docking station 204, and/or the external computing device 206, and with reference to FIGS. 1-2. It is noted that certain operations described in method 400 may be optional or may be rearranged in different embodiments.

The docking station 204 can identify contextual data 232 associated with the docking station 204 and the computing peripherals 250 coupled to the docking station 204, at 402. The information handling system 202 can provide contextual data associated with the information handling system 202 to the docking station 204, at 404. The external computing device 206 can train the configuration management model 260, at 406. The docking station 204 can monitor the contextual data 232 of the docking station 204 and the computing peripherals 250, at 408. The external computing device 206 accesses the configuration management model 260 including the configuration policy 240, at 410. The external computing device 206 identifies one or more of the configuration rules 242 based on the monitored contextual data 232, at 412. The external computing device 206 can provide the identified configuration rules 242 to the docking station 204, at 414. The docking station 204 applies the configuration rules 242, at 416.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method for managing a configuration of a docking station and computing peripherals, comprising:

performing, at a first time, a calibration and configuration of a configuration management model, including:

identifying, by a docking station, contextual data associated with the docking station and the computing peripherals coupled to the docking station, the docking station physically coupled with an information handling system, the computing peripherals including one or more of a monitor, a keyboard, and a mouse, the contextual data associated with the computing peripherals including identifying information associated with the monitor, the keyboard, and the mouse;

providing, by the docking station and to an external computing device in communication with the docking station, the contextual data, the docking station communicatively coupled with the external computing device over a network via a network interface at the docking station;

training, by the external computing device and based on the contextual data, the configuration management model, including generating a configuration policy including configuration rules, the configuration rules for performing computer-implemented actions to automatically configure the docking station and the computing peripherals;

performing, at a second time, a steady-state management of the docking station and the computing peripherals, including:

monitoring, by the docking station, the contextual data of the docking station and the computing peripherals; and providing, by the docking station and to the external computing device, the contextual data;

in response to receiving the contextual data, i) accessing, by the external computing device, the configuration management model including the configuration policy, ii) identifying, by the external computing device, one or more of the configuration rules based on the monitored contextual data, iii) providing, by the external computing device and to the docking station, the one or more configuration rules, and iv) applying, by the docking station, the one or more configuration rules to perform one or more of the computer-implemented actions to configure the docking station and the computing peripherals, including selectively providing power to a first subset of the computing peripherals coupled to the docking station based on the monitored contextual data, and automatically deactivating interfaces of the docking station that are respectively connected to a second subset of the computing peripherals that are in an off-power state.

2. The computer-implemented method of claim 1, wherein the contextual data includes:

calendaring information associated with the information handling system, a quantity of computing peripherals coupled to the docking station, a power state of the computing peripherals coupled to the docking station, an user authentication of a user of the information handling system, and a geo-location of the docking station and the computing peripherals.

3. The computer-implemented method of claim 1, wherein the contextual data includes historical usage of the computing peripherals.

4. The computer-implemented method of claim 1, wherein the contextual data includes an initial time of use of the docking station, and the computing peripherals.

5. The computer-implemented method of claim 1, further including identifying, by the docking station, capabilities associated with each of the computing peripherals, wherein the configuration rules are identified based on the monitored contextual data and the capabilities associated with each of the computing peripherals.

6. The computer-implemented method of claim 1, wherein the computer-implemented actions include automatically establishing connections between the computing peripherals and the docking station without user interaction.

7. The computer-implemented method of claim 1, wherein the computer-implemented actions include automatically initializing the computing peripherals and the docking station without user interaction.

8. A computing environment, including:

an information handling system comprising a processor having access to memory media storing instructions executable by the processor to perform operations;

an external computing device in communication with a docking station and the information handling system, the external computing device comprising a processor having access to memory media storing instructions executable by the processor to perform operations;

a plurality of peripheral devices;

the docking station connected to the plurality of peripheral devices and the information handling system, the docking station comprising a processor having access to memory media storing instructions executable by the processor to perform operations, comprising:

identifying, at a first time, contextual data associated with the docking station and the computing peripherals coupled to the docking station, the docking station physically coupled with an information handling system, the computing peripherals including one or more of a monitor, a keyboard, and a mouse, the contextual data associated with the computing peripherals including identifying information associated with the monitor, the keyboard, and the mouse;

providing, to the external computing device, the contextual data, the docking station communicatively coupled with the external computing device over a network via a network interface at the docking station;

wherein the external computing device is configured to perform operations:

training, based on the contextual data, the configuration management model, including generating a configuration policy including configuration rules, the configuration rules for performing computer-implemented actions to automatically configure the docking station and the computing peripherals, wherein the docking station is further configured to perform operations:

monitoring, at a second time after the first time, the contextual data of the docking station and the computing peripherals; and providing, to the external computing device, the contextual data;

wherein the external computing device is configured to perform operations:

accessing the configuration management model including the configuration policy, identifying one or more of the configuration rules based on the monitored contextual data, providing, to the docking station, the one or more configuration rules, and wherein the docking station is further configured to perform operations:

applying the one or more configuration rules to perform one or more of the computer-implemented actions to configure the docking station and the computing peripherals, including selectively providing power to a first subset of the computing peripherals coupled to the docking station based on the monitored contextual data, and automatically deactivating interfaces of the docking station that are respectively connected to a second subset of the computing peripherals that are in an off-power state.

9. The computing environment of claim 8, wherein the contextual data includes:

calendaring information associated with the information handling system, a quantity of computing peripherals coupled to the docking station, a power state of the computing peripherals coupled to the docking station, an user authentication of a user of the information handling system, and a geo-location of the docking station and the computing peripherals.

10. The computing environment of claim 8, wherein the contextual data includes historical usage of the computing peripherals.

11. The computing environment of claim 8, wherein the contextual data includes an initial time of use of the docking station, and the computing peripherals.

12. The computing environment of claim 8, wherein the docking station is further configured to perform operations identifying capabilities associated with each of the computing peripherals, wherein the configuration rules are identified based on the monitored contextual data and the capabilities associated with each of the computing peripherals.

13. The computing environment of claim 8, wherein the computer-implemented actions include automatically establishing connections between the computing peripherals and the docking station without user interaction.

14. The computing environment of claim 8, wherein the computer-implemented actions include automatically initializing the computing peripherals and the docking station without user interaction.

15. A non-transitory computer-readable medium storing software comprising instructions executable by one or more computers which, upon such execution, cause the one or more computers to perform operations comprising:

performing, at a first time, a calibration and configuration of a configuration management model, including:

identifying, by a docking station, contextual data associated with the docking station and the computing peripherals coupled to the docking station, the docking station physically coupled with an information handling system, the computing peripherals including one or more of a monitor, a keyboard, and a mouse, the contextual data associated with the computing peripherals including identifying information associated with the monitor, the keyboard, and the mouse;

providing, by the docking station and to an external computing device in communication with the docking station, the contextual data, the docking station communicatively coupled with the external computing device over a network via a network interface at the docking station;

training, by the external computing device and based on the contextual data, the configuration management model, including generating a configuration policy including configuration rules, the configuration rules for performing computer-implemented actions to automatically configure the docking station and the computing peripherals;

performing, at a second time, a steady-state management of the docking station and the computing peripherals, including:

monitoring, by the docking station, the contextual data of the docking station and the computing peripherals; and providing, by the docking station and to the external computing device, the contextual data;

in response to receiving the contextual data, i) accessing, by the external computing device, the configuration management model including the configuration policy, ii) identifying, by the external computing device, one or more of the configuration rules based on the monitored contextual data, iii) providing, by the external computing device and to the docking station, the one or more configuration rules, and iv) applying, by the docking station, the one or more configuration rules to perform one or more of the computer-implemented actions to configure the docking station and the computing peripherals, including selectively providing power to a first subset of the computing peripherals coupled to the docking station based on the monitored contextual data, and automatically deactivating interfaces of the docking station that are respectively connected to a second subset of the computing peripherals that are in an off-power state.

16. The non-transitory computer-readable medium of claim 15, wherein the contextual data includes:

calendaring information associated with the information handling system, a quantity of computing peripherals coupled to the docking station, a power state of the computing peripherals coupled to the docking station, an user authentication of a user of the information handling system, and a geo-location of the docking station and the computing peripherals.

17. The non-transitory computer-readable medium of claim 15, wherein the contextual data includes historical usage of the computing peripherals.

18. The non-transitory computer-readable medium of claim 15, wherein the contextual data includes an initial time of use of the docking station, and the computing peripherals.

* * * * *